US006063226A

United States Patent [19]

Foster et al.

[11] Patent Number: 6,063,226

[45] Date of Patent: May 16, 2000

[54] METHOD FOR MANUFACTURING A FILE FOLDER HAVING A POCKET

[75] Inventors: Allan Eugene Foster, Yarmouth Port, Mass.; Lee A. Boy, Jamestown, N.C.; Steven Read, Fountain Valley, Calif.; Mark Rocco; Juan C. Gonzales, both of Chino, Calif.; Mark D. Van Leer, Beaufort; Harry S. Smith, Leslie, both of Mo.

[73] Assignee: Esselte Corporation, Garden City, N.Y.

[21] Appl. No.: 09/059,265

[22] Filed: Apr. 14, 1998

Related U.S. Application Data

[62] Division of application No. 08/636,041, Apr. 22, 1996, Pat. No. 5,833,271.

[51] Int. Cl.[7] .............................. B32B 31/00; B32B 7/14

[52] U.S. Cl. ............................ 156/250; 40/359; 156/291; 156/324; 156/516; 156/548; 156/549; 156/553; 156/554; 493/947

[58] Field of Search .................................... 156/291, 554, 156/250, 516, 553, 548, 549, 324; 40/359; 493/947

[56] References Cited

U.S. PATENT DOCUMENTS

| | | | |
|---|---|---|---|
| 1,743,305 | 1/1930 | Banks | 40/359 |
| 2,291,724 | 8/1942 | Jonas | 129/16 |
| 2,330,402 | 9/1943 | Winokar | 129/16.7 |
| 3,168,016 | 2/1965 | Kehr | 156/291 |
| 4,109,850 | 8/1978 | Meenan et al. | 229/72 |
| 4,301,962 | 11/1981 | Monckton et al. | 229/72 |
| 4,462,854 | 7/1984 | Wenstrom et al. | 156/549 |
| 4,523,776 | 6/1985 | Barber | 283/39 |
| 4,830,268 | 5/1989 | Pitts | 229/68 R |
| 4,893,745 | 1/1990 | Weber et al. | 229/1.5 R |
| 4,966,639 | 10/1990 | Pfeffer et al. | 156/359 |
| 5,009,361 | 4/1991 | Chariton et al. | 229/1.5 R |
| 5,141,485 | 8/1992 | Welt | 493/210 |
| 5,160,296 | 11/1992 | Katz | 462/6 |
| 5,255,779 | 10/1993 | Koenig, III | 206/232 |
| 5,256,130 | 10/1993 | Kachel et al. | 493/210 |
| 5,480,024 | 1/1996 | Hertema | 206/232 |

FOREIGN PATENT DOCUMENTS

| | | | |
|---|---|---|---|
| 1246790 | 10/1960 | France | 40/359 |
| 1354556 | 1/1964 | France . | |
| 3143959 | 5/1983 | Germany . | |
| 3446783 | 6/1986 | Germany . | |

OTHER PUBLICATIONS

"Jacobs Gardner Office Supply Catalog," File Folders Section, p. 268, Item B, Classification folders with pocket style dividers, Dec. 1990.

Jacobs Gardner Office Supply Catalog, File folders section, p. 268, Item B, Classification folders with pocket style dividers, Dec. 1990.

*Primary Examiner*—Deborah Jones
*Assistant Examiner*—Robert R. Koehler
*Attorney, Agent, or Firm*—Pennie & Edmonds LLP

[57] ABSTRACT

A file folder has a pocket disposed on one of its surfaces. The edges of the pocket and the file folder are in sheared alignment with each other. A method for manufacturing a file folder having a pocket is disclosed. Adhesive is deposited along several edges of a first web of material which is pressed to a second web of material to join the webs together by the adhesive. The combined materials are cut along one of the edges of adhesive to form a sheet having a pocket. The first and second webs have side edges which are in sheared alignment.

18 Claims, 5 Drawing Sheets

METHOD FOR MANUFACTURING A FILE FOLDER HAVING A POCKET

CROSS-REFERENCE TO RELATED APPLICATION

This is a division of application Ser. No. 08/636,041, filed on Apr. 22, 1996 now U.S. Pat. No. 5,833,271.

FIELD OF THE INVENTION

The present invention relates to paper office supplies, and, in particular, to a file folder having a pocket attached thereto. The present invention also relates to a method for manufacturing a file folder having a pocket.

BACKGROUND OF THE INVENTION

File folders, and, in particular, hanging file folders have been used in standard storage units such as file cabinets, desk drawers, and the like, and are a necessary storage tool in modern offices and businesses. Such folders in the art are best exemplified by expired U.S. Pat. No. 2,291,724. This reference describes a file formed by a sheet of heavy material with a central fold, which forms the folder's bottom and open sides. Folds are provided in the files top edges through which hanging rods are movably or immovably fixed. The ends of these rods are exposed and notched, enabling the file to hang on a complementary standard parallel file frame in office storage equipment, such as filing cabinets and desk drawers.

With the advent of the personal computer, there is often a need to store computer disks and similar items in file folders, in addition to paperwork. It is convenient for the user to be able to store these types of items in separate pockets within a single file folder. It is also desirable to be able to store documents or similar items in a separate storage area within the same file folder. Therefore, there is a need for a file folder which includes a pocket for storing such items. It is also desirable to have an efficient, cost-effective means for applying a pocket to a file folder.

SUMMARY OF THE INVENTION

Accordingly, the present invention is directed to a file folder which includes a first and second sheet of flexible material. The first sheet is folded at a medial line to form a bottom edge with first and second side wall portions joining at the bottom edge. Each side wall portion has a pair of sheared side edges. The second sheet is attached to the first sheet to form at least one pocket. The second sheet has a pair of side edges which are located in sheared alignment with the side edges of the first sheet.

Preferably, the first and second sheets have generally parallel side edges. The second sheet may have four edges including a top edge, a bottom edge, and two side edges.

The second sheet is attached to the first sheet by an adhesive. The adhesive may be disposed along the side and bottom edges of the second sheet so that when the second sheet is attached to the first sheet, at least one pocket is formed with an opening at the top edge of the second sheet.

The second sheet may be affixed to an internal surface of the first side wall portion of the first sheet. The second sheet bottom edge may then be located adjacent and parallel to the folded edge of the first sheet. The first sheet may be a different color from the second sheet to provide visual differentiation of the at least one pocket.

The first and second side wall portions may include upper terminal edges which are folded on themselves to form channels. At least one rod may be disposed through the channels. A plurality of uniformly spaced slots may be disposed on an inner surface of the upper terminal edges for receiving label tabs. The bottom edge of the file folder may also include at least one horizontal linear depression which provides a crease line for forming at least one additional medial line to allow for expansion of the bottom of the file folder.

The method, according to the present invention, is for use in manufacturing a file folder having a pocket. The method includes depositing an adhesive along a first edge of a first web of flexible material. An adhesive is also deposited on a second edge of the first web at an angle relative to the first edge. Pressing the first web against a second web of flexible material by feeding them together at a work station results in joining the first web to the second web by the adhesive. In order to form a sheet having a pocket disposed thereon, the first and second webs are cut through one of the edges so that at least one side of the sheet and pocket are in sheared alignment.

The method may also include timing the deposit of adhesive on the second edge to be operatively associated with the cutting step so that the cutting occurs along an axis of each edge of adhesive to be cut.

The cutting may occur on the second angled edge of adhesive and the edge is of a width sufficient to allow cutting so that joined sides are formed on each side of the cut. The cutting forms an open edge and three closed edges on the first web. The second angled edge may be substantially perpendicular to the bottom edge.

At least one edge of adhesive may be a hot melt adhesive which is extruded in a line. The other edge of adhesive may be a hot melt adhesive which is extruded in beads.

The method may also include folding the sheet along a medial line to form a bottom edge with first and second side wall portions joined at the bottom edge. The first and second side wall portions may have upper terminal edges. The upper terminal edges may be folded on themselves to form a channel. A rod member may be placed in the channel. Slots may also be provided along the upper terminal edges before folding.

The method may also include selecting different colors for the first web and the second web to provide visual differentiation between the webs.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE PREFERRED EMBODIMENTS

Figure 1:
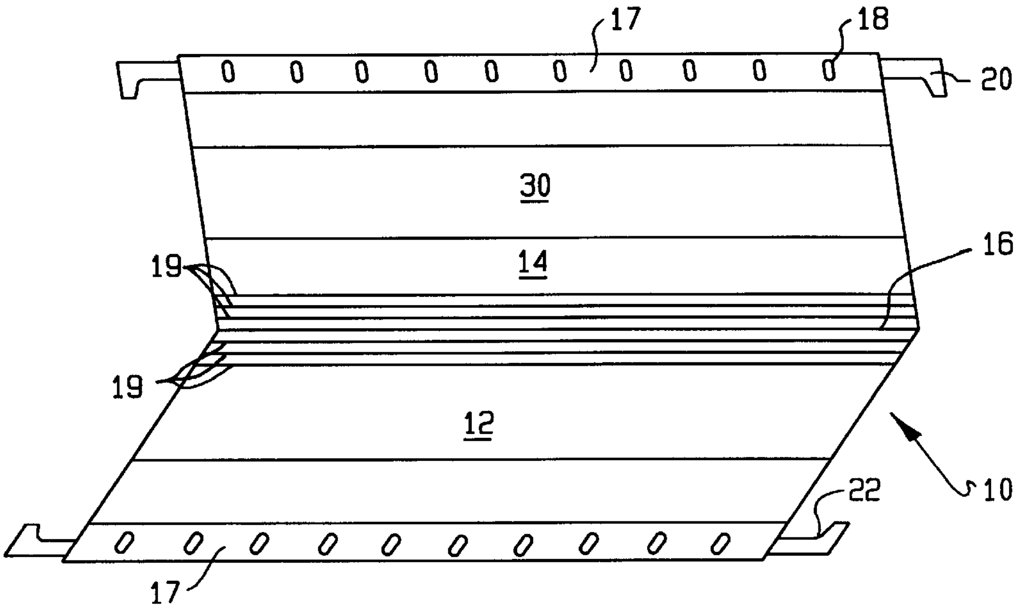
FIG. 1 is a perspective view of a hanging file folder incorporating a pocket of the present invention.

FIG. 1 shows a hanging file folder 10 having a front portion 12 and a rear portion 14 divided by a medial fold 16. Terminal folds 17 are located at the upper edges of the front and rear portions which, on the interior of the file, define slots 18 for tabs and through which hanging rods 20 are disposed. The end portions of each hanging rod 20 have notches 22 which are complementary to a standard filing frame in office storage equipment, enabling the file to hang while stored, e.g., in a file drawer. A pocket 30 is attached to the inside of the rear portion 14 of the file folder 10. The folder 10 also includes a plurality of crease lines which are horizontal linear depressions. The bottom of the folder 10 may be widened to different widths by creasing different combinations of depressions.

Figure 2:
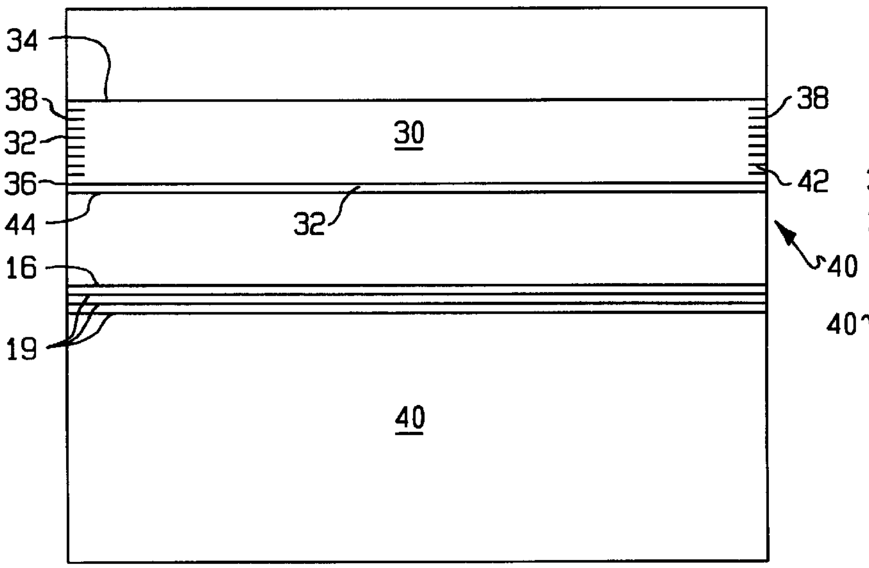
FIG. 2 is an elevated view of the interior of a file folder incorporating the pocket of the present invention.
Figure 3:
FIG. 3 is an end view of the file folder of FIG. 2 showing the pocket in position on the file folder.

As shown more clearly in FIGS. 2 and 3, the pocket 30 is attached to a standard file folder 40 by an adhesive 32 along three sides of the pocket to define an opening along one side. As shown in FIG. 2, the opening is defined along the top edge 34, but, in practice, may be along any of the sides. A line of adhesive 36 is deposited along the bottom edge 44 to preferably define a continuous bead of adhesive. It should be noted that an intermittent bead of adhesive may also be used instead of a continuous bead. Adhesive is also deposited along the side edges 38 of the pocket. As is shown in FIG. 2, it is preferable to deposit a series of beads of adhesive 42 along the side edge 38 of the pocket 40. In the preferred embodiment, eight beads of adhesive 32 are shown. The adhesive 32 bonds the pocket 30 to the file folder 40. The individual beads of adhesive are represented in FIG. 2 as slash marks or short lines, which are not necessarily indicative of the actual shape or size of the beads of adhesive in all instances. Separate beads of adhesive may also be dot-shaped or may take on a variety of different shapes. It should be noted that the term "edge" as used herein refers to the position at which the adhesive is deposited. It does not, in all cases, refer to an actual cut edge. The term "edge" may be used interchangeably to refer to a line, a series of beads, or a bar of adhesive.

Figure 4:
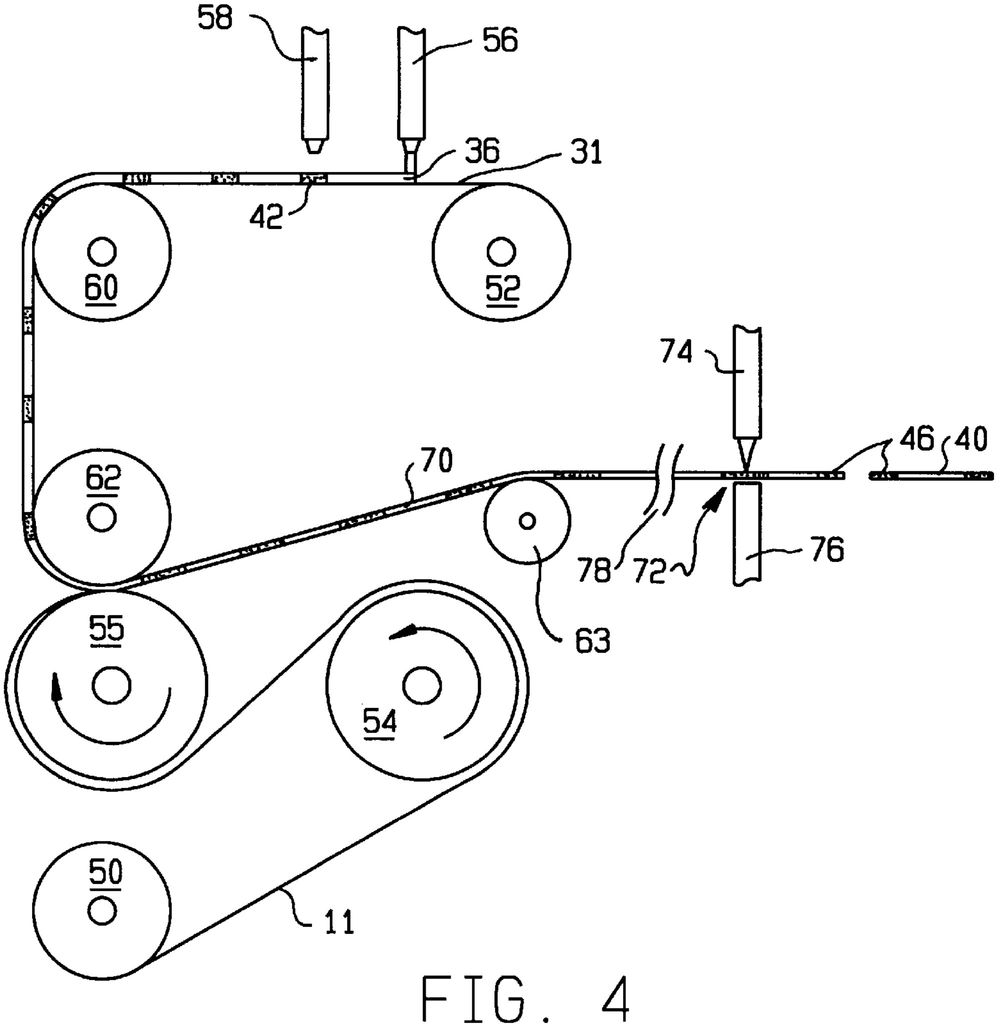
FIG. 4 is an elevated view of the system used to manufacture a file folder incorporating the pocket of the present invention.

FIG. 4 shows the system for applying the pocket 30 to the file folder 40 of the present invention. The system includes two supply rollers. The first supply roller 50 includes the folder material 11 which is in the form of a web. A web is a large continuous roll of material. The web may be a roll of paper or a similar material. The material of the preferred embodiment is an 11 point, 124 pound basis weight paper, which is commercially available from International Paper of Louisiana. The second supply roller 52 includes the pocket material 31, which is also in the form of a web. The material of the preferred embodiment is a 32 pound basis weight paper under the trade name Gatorhide, which is commercially available from International Paper, Louisiana. The term web will be used herein interchangeably with the word material when referring to the pocket and/or folder material. The folder material 11 and the pocket material 31 are preferably flexible in nature.

The folder material 11 is fed around a pair of driven S-wrap rollers 54, 55 in order to feed the stock through the system. The S-wrap rollers 54, 55 are operatively connected to each other so that they rotate at the same speed in order to feed the folder material evenly and continuously through the system. Rollers of the type preferred are available from Cobb & Sons of Whittier, Calif.

The pocket material 31 is pulled through the system by its contact with the folder material 11. As the pocket material 31 is removed from the supply roller 52, a plurality of extrusion heads are preferably positioned to extrude an adhesive onto the pocket material 31. Two extrusion heads are shown in FIG. 4, but more than two may be used.

A first extrusion head 56 deposits a continuous bead which forms a line of adhesive 36 onto one longitudinal edge of the pocket web 31. The continuous bead of adhesive 36 is preferably of a predetermined width sufficient to attach the edge to the folder web.

A second extrusion head 58 extrudes adhesive in a constant interval pattern 42 onto the pocket material 31 so that the extrusion head 58 has both an "on" period, when adhesive is extruded through the head, and an "off" period, when the extrusion head is inactive. Preferably, the second extrusion head 58 extrudes adhesive along an edge 42 which is perpendicular to the continuous bead of adhesive 36 and which is configured and dimensioned in a predetermined width and length so that it spans the length of the pocket material 31 to attach the pocket web to the folder web along that edge. Extrusion heads of this type are commercially available from Slautterback Corp. of Monterey, Calif.

Since the adhesive 32 is administered on one side of the pocket material 31, a positioning roller 60 is used to position the adhesive 32 for joining with the folder material 11. In order to adhere the pocket material 31 to the folder material 11, both the pocket material 31 and the folder material 11 pass between one of the S-wrap rollers 55 and a pressure roller 62. The pressure roller 62 is situated in opposing relation to the S-wrap roller 55. The pressure roller 62 applies force to the pocket material 31 and the folder material 11 against the fixedly positioned S-wrap roller 55 in order to bond the adhesives disposed on the pocket material 31 to the folder material 11. The contact between the pressure roller 62 and the S-wrap roller 55 also helps to drive the webs 11, 31 through the system. It should be noted that the pressing together of the webs does not have to occur against a driven roller. The pressing together of the webs can occur between a nip roller (which is not driven) and a pressure roller, where the driven roller is located farther up stream or down stream of the pressure roller. In this instance, the driven roller could be opposed by a nip roller in order to feed the material through the system.

After the pocket material 31 has been pressed against the folder material 11, the pocket material 31 is preferably fixed in position on the folder material 11 to form a combined material 70. The combined material 70 then passes over an intermediate roller 63 to a cutting assembly 72 where the combined material 70 is severed into separate pieces 40. After the combined material 70 has been severed into independent folders 40, the folders 40 may be processed further to include other folder features or the hanging folder features, as shown in FIG. 1, if so desired. In addition, at location 78, further processing of the combined material may occur prior to cutting the combined material 70. For example, slots 18 may be punched in the combined material 70 along the terminal edges 17 to produce a hanging folder 10 or the medial fold 16 may be created.

The cutting assembly 72 preferably includes a cutting blade 74. The cutting blade 74 preferably moves downward, like a guillotine, to sever the combined material 70 into individual folders 40. It should be noted that other cutting mechanisms are contemplated for use with the present system. For example, a guillotine-type cutter may be used with a cutting block or anvil 76. Of importance here is that the cutting blade 74 severs each layer of the combined material 70 along each edge 42 of adhesive in order to split the edge into two separate joined portions 46.

The cutting blade 74 is timed to cut the combined material 70 when each edge 42 is positioned centrally below the cutting blade 74. The edge 42 is of sufficient width so that when it is cut down the middle of the edge 42, two joined edges 46 remain. In this way, a pocket 30 is formed on each individual folder 40. The three adhesived edges, including the bottom edge 36 and the side edges 46, create a U-shape of adhesive to form the outer edges of the pocket 30. Advantageously, this system produces a high quality product in an efficient manner. In addition, each pocket side edge 38 is in sheared alignment with the side edge of the folder 40 to create a clean cut and to maximize the size of the pocket so that it extends across the entire width of the folder. By sheared alignment, we mean that one piece of material is interposed on another and then both pieces of material are cut at the same time. It is recognized that this cutting procedure usually results in the edges of the materials being exactly aligned along the shear cut. But, in some cases, there can be slight movement between the materials if the cut occurs before the adhesive has completely dried. In this second instance, the edges of the separate materials may not be exactly aligned. In fact, it may be advantageous to cut the pieces with a shearing motion and then, by an independent means, move one or both of the edges so that they are not in exact alignment. Both situations are intended to be encompassed within the meaning of the terms "sheared alignment".

The system may also include tension control devices (not shown) in combination with brake controls (not shown) for maintaining a uniform tension on the webs as the supply rolls 50, 52 are depleted. Maintaining a constant tension is important to the overall operation of the system, particularly when dealing with flexible materials, such as paper. Flexible materials tend to stretch when tensioned. If the tension on the materials is not maintained at a constant level, when the pocket web 31 is attached to the folder web 11 and the materials relax, gapping and pulling may result between the materials. By maintaining a constant tension between the materials, when the materials relax, the pocket 30 will rest properly on the folder 40. A tension control device which is commercially available from Dover Flexo Electronics Inc. of Rochester, N.H. may be utilized to maintain tension in conjunction with a brake control which is commercially available from Horton of Webster, Wis.

Figure 5:
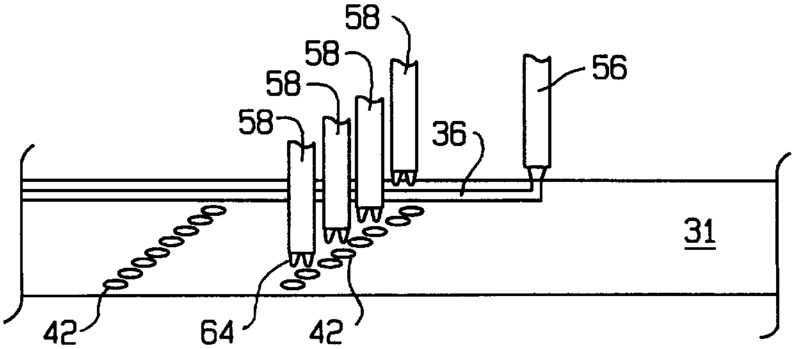
FIG. 5 is a perspective view of the pocket web and the adhesive extruding heads of a preferred embodiment of the present invention.

A preferred embodiment of the present invention is presented in FIG. 5 showing the application of adhesive to the pocket material 31. As discussed previously, the extrusion heads are used for two purposes. The first purpose is to apply a continuous line of adhesive 36 along one longitudinal edge of the pocket material 31. The second purpose is to apply lines of adhesive 42 transversely across the pocket material 31 in a line which is angled relative to, and preferably perpendicular to, the continuous bead 36. In the preferred embodiment, this is accomplished by using four extrusions heads 58, each of which emits two beads of adhesive 42 onto the pocket material 31 through a dual orifice 64. It should be noted that individual beads of adhesive may be used instead of lines of adhesive to perform the same function as lines, and vice versa. Advantageously, when individual beads are deposited on a material and a second material is pressed onto the first material, the beads of adhesive will typically spread out to form a continuous line. It should also be noted that it may be desirable to deposit beads which do not spread out to form a continuous line. This may be desirable where a non-continuous line of adhesive is sufficient to hold the material in place and for the particular use. The series of extrusion heads, for applying adhesive to edge 42, as shown in FIG. 5, is currently preferred because of its high reliability and low cost.

Other methods of applying adhesive are known and may be used with the system of the present invention. For example, eight extrusion heads can be used instead of four to extrude beads of adhesive onto the pocket material 31. An extrusion head in the shape of a bar can be used, instead, where either beads of adhesive or a strip of adhesive is applied along the length of the head. Extrusion heads of both types are commercially available from Slautterback Corp. of Monterey, Calif. In addition, a combination of several types of extrusion heads may be used.

The adhesive may also be printed onto the pocket material 31. There are at least two types of printing which can be utilized: 1) flexigraphic and 2) gravure. In both cases, adhesive is applied via a printing roller which is rolled onto the pocket material 31. Extrusion heads are preferred instead of printing because they are less expensive and take up less space in the system. In addition, an extrusion head which extrudes beads is preferred to other types of extruding heads because bead extruding heads are less expensive and more reliable. It is anticipated that a combination of printing and extruding can also be utilized. For instance, the adhesive could be applied to the edge 44 of the pocket web 31 by extruding a continuous bead while the angled edges of adhesive 42 can be printed on, or vice versa.

Different types of adhesive may be used to apply the pocket material 31 to the folder material 11. Three types of adhesive include resin-based, hot melt and animal-based adhesive. A hot melt bead extrusion adhesive which is polymer-based is preferred and is commercially available from H.B. Fuller Co. of St. Paul, Minn. (Model No. 2055). Advantageously, the hot melt polymer adhesive starts to cool and cure immediately after extrusion. When the hot melt polymer is extruded in bead form, it contacts the cool web material and develops a skin around the outer edge of the bead as it starts to cool. With this type of adhesive, when the adhesive on the pocket material 31 passes between the pressure roller 62 and the S-wrap roller 55, the adhesive in the center of the bead, which has not yet cured, is squeezed past the skin which has formed and is pressed outward to cover a larger surface area than the original bead. Advantageously, the polymer adhesive immediately begins to cure when it hits the cool pocket material 31. Therefore, the contact of the pocket material 31, adhesive, and folder material 11 between the pressure roller 62 and the S-Wrap roller 55 causes the adhesive to fix the pocket material 31 to the folder material 11 after the materials have been pressed together.

With hot melt adhesives, the temperature of the adhesive is important for either printing the adhesive or extruding it. If the adhesive is too hot, it will string. If the adhesive is too cold, it will not flow well. Therefore, based on the type of hot melt adhesive selected, it is necessary to use the adhesive at a proper temperature.

Resin-based adhesives are of the type which include an emulsion in water. An example of this type of adhesive is Elmer's Glue. With resin-based adhesives, the water in the adhesive must be dried out before the adhesive cures, unlike the hot melt polymer adhesive which does not have to be dried. In order to dry the adhesive, more pressure rollers are used against opposing rollers to compress the adhesive between the pocket material 31 and the folder material 11.

When the materials are pressed through a series of rollers, the water in the adhesive is absorbed into the paper or flexible material. This helps the adhesive to dry more quickly. Resin-based adhesives may be either printed or extruded. As is evident if a resin-based adhesive is utilized, more pressure rollers 62 in conjunction with opposing rollers will be needed, thereby increasing the cost of equipment and the amount of space which the rollers take up within the system.

Referring again to FIG. 4, the pressure roller 62 exerts force onto the S-Wrap roller 55 in order to press the pocket material 31 and adhesive onto the folder material 11. The pressure roller 62 is preferably forced downward upon the opposing roller by a spring, such as a coil spring or air spring, or similar means. The pressure roller is preferably composed of a resilient or rubber-like material. The preferred material for the pressure roller is polyurethane. The pressure roller 62 may be pressed against a series of stops (not shown) by the force of a spring so that it exerts pressure on the opposing roller 55. It is desirable to eliminate any bounce between the pressure roller 62 and the opposing roller 55 in order to have continuous contact between the two rollers. Continuous contact helps to effectively adhere the pocket material 31 to the folder material 11. The resilient material and spring of the pressure roller 62 help to reduce this possibility.

Referring again to FIG. 4, the S-Wrap rollers 54, 55 are a commonly used method for feeding or driving flexible materials, such as paper, through a system. It is also known to feed flexible materials with a single driven roller. The S-Wrap rollers 54, 55, however, are preferred because they maximize the contact of the material with the rollers, thereby reducing gapping and sagging and keeping the material engaged with the rollers. Since the means of driving the materials through the system is friction, it is desirable to maximize the contact area of the material with the drive mechanisms, which is accomplished more readily with the S-wrap rollers. Both S-wrap rollers 54, 55 are driven and are preferably directly connected to each other by gearing, belting, or the like, so that they rotate at the same speed.

Referring again to the system shown in FIG. 4, it is desirable to utilize a timing mechanism to automatically perform the cutting and adhesive extrusion. Timing is important to the effective operation of the system since the cutting edge 74 must cut each angled edge 42 of adhesive substantially down the central axis of the edge in order to create joined edges on each side of the cut. In addition, the adhesive must be dispensed at equal intervals in order to produce a consistently sized product. For a hanging file folder, a width of 11¾" is used to produce a letter size folder for each length of folder material 11. A legal size folder is produced from a width of 14¾". Therefore a means for timing is preferably provided.

Figure 6:
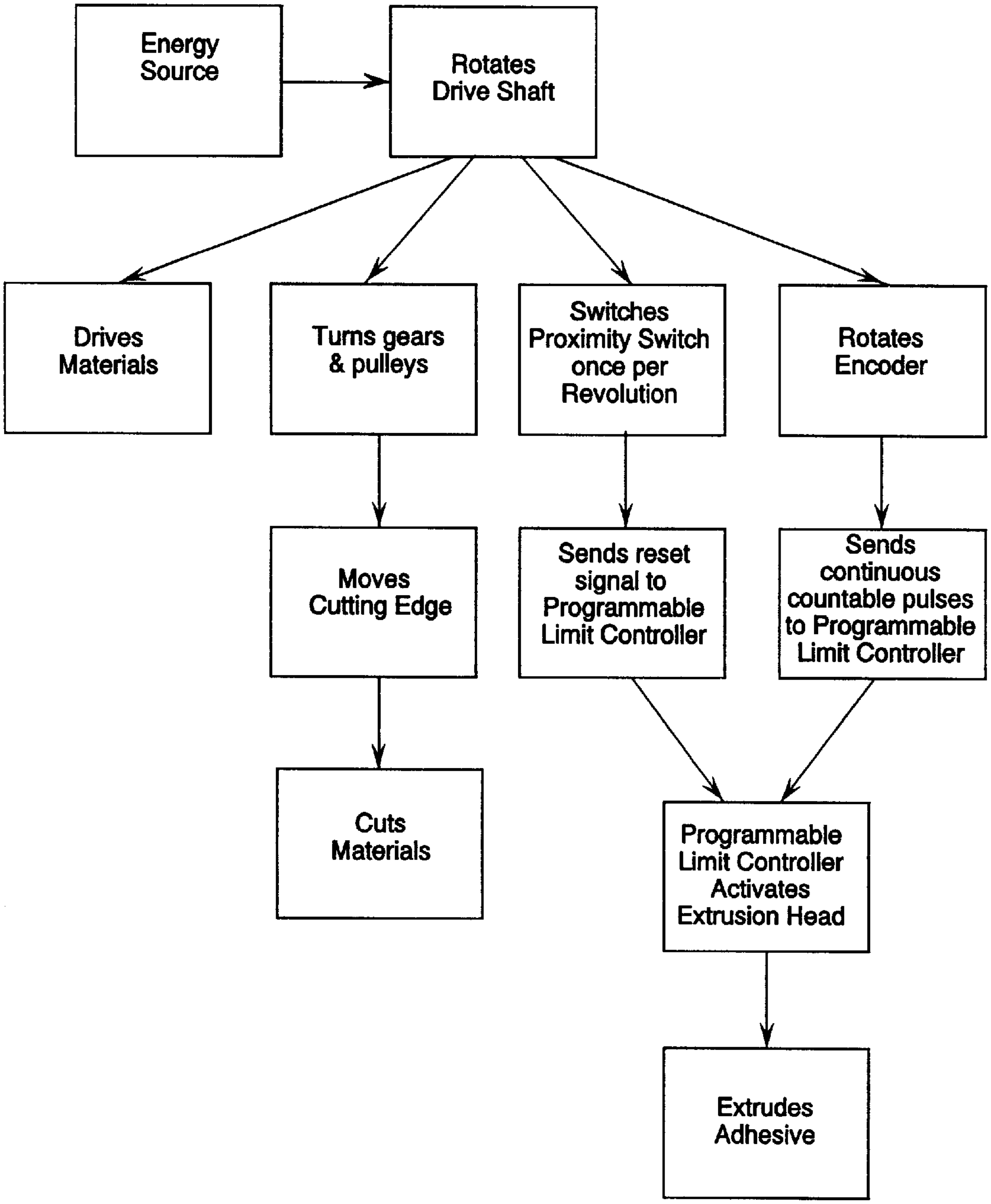
FIG. 6 is a flow chart of the timing operation of the system of the present invention as driven by an encoder.

In the preferred embodiment, an electronic mechanism and a rotary mechanism are utilized for timing purposes, although it will be evident to one skilled in the art that an entirely electronic system or an entirely rotary system may be used. In the preferred embodiment, as depicted in the flow-chart of FIG. 6, the drive shaft of the S-Wrap rollers 54, 55 is turned by an energy source at a constant speed. The S-wrap rollers 54, 55, in turn, drive the folder material 11 through the system. The drive shaft is, preferably, connected to the cutting assembly 72 by a series of gears and pulleys. It is preferable to configure the gears and pulleys so that each rotation of the drive shaft results in a cutting movement.

In order to cut the combined material 70 into the desired width, it is preferable that one rotation of the drive shaft results in the advancement of a proper amount of folder material. This may be accomplished by adjusting the diameter of the drive rollers or the diameter of the drive shaft. It is also possible to accomplish this result by adjusting the gearing or by similar means. The gearing and pulleys which connect the drive shaft to the cutting edge serve to transfer power from the drive shaft to move the cutting edge up and down to perform the cutting.

It should be noted that a number of different types of cutting edges may be used. For instance, a rotary cutter, may be used as well as a guillotine, the type previously discussed, or the like. Each type of cutter may be connected to the drive shaft by a series of gears or pulleys in order to properly time the cut.

Timing of the system may also be accomplished by electronic means. In the preferred embodiment, shown in FIG. 6, the adhesive extrusion is governed by electronic means. It is preferable to use a signal which coincides with the rotation of the drive shaft. This may be accomplished by the use of a proximity switch located in the vicinity of the drive shaft.

A metal flag may be mounted on the drive shaft so that when the flag rotates into proximity with the proximity switch, the switch turns on. When the metal flag rotates away from the switch, the switch turns off, or vice versa. The proximity switch then sends a reset signal to a programmable limit controller for signaling the extrusion heads to extrude adhesive. An encoder can also be connected to the drive shaft to send a regular series of countable pulses to the programmable limit controller as the drive shaft rotates. The proximity switch, controller, and encoder of the type contemplated by the preferred embodiment are available from Slautterback Corp. of Monterey, Calif. It should be noted that, in the preferred embodiment, the signal will only travel to the extrusion heads 58 which produce the angled edge of adhesive 42 since the other extrusion head 56 creates a continuous bead of adhesive 36 and is not turned on and off during the cycle. It should also be noted that physical rotary devices such as cams, or the like, may be used in place of electronic signalling. The cam actuates a relay or an air switch, or the like, which actuates the extrusion head to extrude adhesive. A cam, however, is less desirable than the proximity switch because if an adhesive edge of a different width is desired, the cam has to be replaced. Also, the cam can bounce and/or wear. It should also be noted that more sophisticated controllers such as programmable logic controllers or computers may be used in place of the programmable limit controller. In addition, gears and pulleys may be particularly useful if printing is used instead of extrusion.

The programmable limit controller starts the count at zero and counts upward until it is signalled by the proximity switch to reset. In the preferred embodiment, the reset signal comes from the proximity switch. Other forms of signalling to reset the counter in the programmable limit controller can be used such as an "electric eye" optical beam, and the like.

The encoder provides continuous countable pulses. During each counting cycle, the programmable limit controller is programmed to signal the extrusion heads 58 to emit beads of adhesive 42 at discrete time periods, or counts. In operation, for example, the encoder may provide 1000 pulses per revolution of the draft shaft. The counter may be reset by the proximity switch once per revolution of the drive shaft. The programmable limit controller can be programmed to signal the extrusion heads 58 to extrude adhesive 42, for example, between count 300 and 375. If the cutting mechanism is governed electronically, the encoder can also be programmed to signal the cutter 74 to cut at, for example, count 700. In this way, the operations of the cutter 74 and extrusion heads 58 may be staggered in order to create pockets 30 on the file folders 40. Therefore, the system can be timed to prepare any size folder/pocket by modifying the programming of the programmable limit controller and the amount of material fed through the system during each cycle. Where either the extrusion heads or the cutting assembly 72 are timed via rotary means, the gearing will be configured so that the cutting and extruding are coordinated with each other to provide a properly sized file folder.

There are other known ways to time the operation of the system. For example, a cam can be mounted on the drive shaft to reset the counter in the programmable limit controller instead of the proximity switch. Also, the cam can bounce and/or wear.

Figure 7:
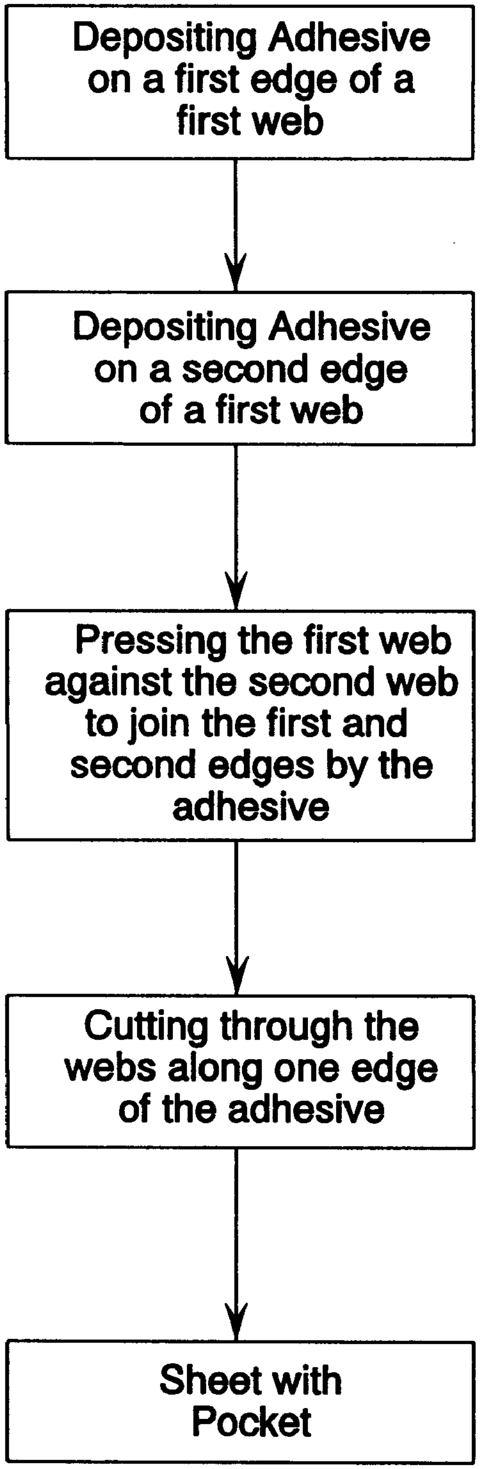
FIG. 7 is a flow chart of the method of manufacturing a file folder having a pocket of the present invention.

Referring now to FIG. 7, the method of manufacturing a file folder having a pocket includes several steps. First, an edge of adhesive 36 is deposited along a bottom edge 44 of the pocket material 31. The edge of adhesive deposited along the bottom edge 44 is preferably continuously deposited. The pocket material is also referred to as the first web. Concurrently, a plurality of lines, bars, or beads of adhesive are extruded onto the pocket web 31 along another edge 42.

The edges of adhesive 42 are positioned at an angle relative to the continuous line 36 and are preferably perpendicular to the continuous line of adhesive 36. The bar of adhesive is preferably made up of a series of extruded beads. The combination of the continuous line and the angled edges 42 form continuous attached patterns of adhesive in the shape of a "U". The angled edges of adhesive 42 preferably have a width which is sufficient in size so that when the angled edges are cut in half, two joined edges 46 are created to form two separate pocket edges.

After the adhesive is applied to the pocket material 31, the pocket material 31 and the folder material 11 pass between a pressure-exerting roller 62 and a driven roller 55. The folder material 11 is also referred to herein as the second web. The driven roller 55 drives the materials through the system. The pressure roller 62 exerts force on the materials so that the adhesive is pressed between the two webs, the adhesive thereby spreading out slightly.

After the pocket material 31 has been joined to the folder material 11, the combined material 70 passes under a cutting edge 74. The cutting edge 74 moves downward to cut the combined material 70 into separate pieces, each piece identifying a separate file folder. The cutting edge 74 cuts the combined material 70 along an axis defined substantially through the center of the angled edges of adhesive 42. The cutter 74 cuts through the angled edges 42 so that the adhesive is disposed on both sides of the cutting edge 74 to form two joined edges 46 on either side of the cut.

It should also be noted that a reciprocating process of cutting the combined material 70 may be used in place of a continuous cutting process. With the reciprocating process, the combined material 70 is temporarily halted in order to perform operations on the material, such as adding hanging file folder features. When the material is stopped, the cutting may occur. The material may be stopped by placing a bar over the moving material to hold it in place temporarily or by other known means.

Since the cutting edge 74 cuts through an axis of each angled edge of adhesive 42, a U-shaped adhesive layer remains on each individual file folder. The U-shaped adhesive connects the pocket web 31 to the folder web 11 and results in the formation of a pocket on the folder. Advantageously, the side edges of the pocket 38 are in sheared alignment with the side edges of the folder, creating a clean edge on the file folder where the folder and pocket meet. Since a clean edge is created on each file folder, it is never necessary to align the pockets on the folder after the folder has been created or to trim the pockets separately to fit onto the file folders.

The process also, preferably, is timed so that the angled edges of adhesive 42 are applied at a proper location and so that the cutting edge severs the combined material 70 through an axis of each angled edge of adhesive 42 to create a pocket 30. The axis is preferably located substantially centrally down the length of the adhesive 42. Again, this timing may be accomplished by either rotary or electronic means. The above described process is desirable over other processes in that it is reliable and simple. Rather than having to pre-cut pockets and time their placement onto the folder material, or hand place them, the process places the pocket by conveying sheets of material and severing them after the materials have been combined. The process is not handicapped by speed limitations, the only limitations being the strength of the materials being utilized.

Figure 8:
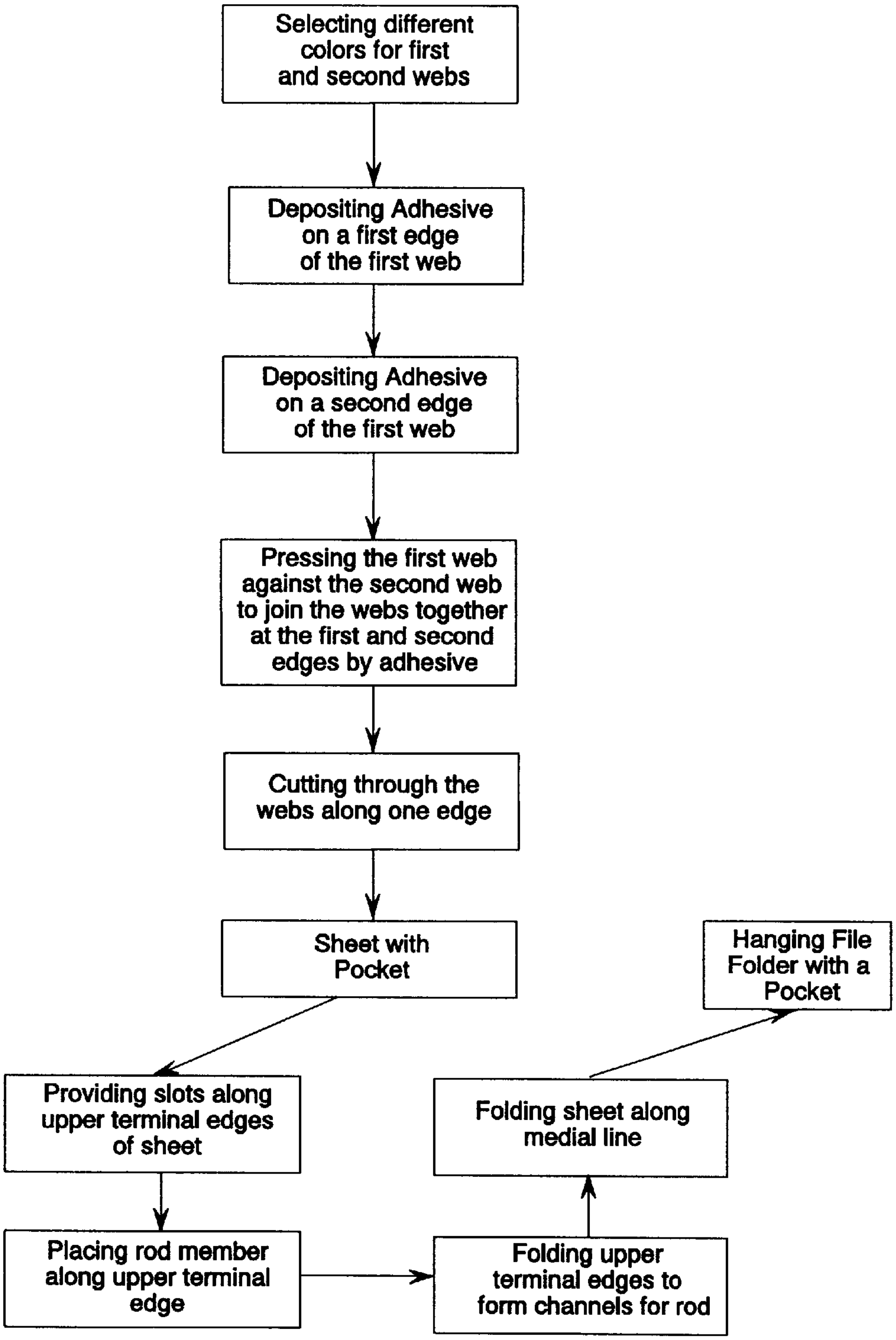
FIG. 8 is a flow chart of the method of manufacturing a hanging file folder having a pocket of the present invention.

As shown in FIG. 8, the above-described method for manufacturing a file folder having a pocket may be expanded upon in order to create a hanging file folder. In this process, it is preferable to select different colors for the pocket material 31 and the folder material 11 in order to provide visual differentiation between the two materials. It is, likewise, preferable to select different colors for the two webs when creating a file folder.

After the adhesive has been deposited on two edges of the first web and the first web has been pressed against a second web to join the webs along the edges of adhesive, the webs are cut through one of the edges to form a sheet with a pocket. The sheet may then be folded along a medial line 16 to form a bottom edge 16 with first 12 and second 14 side wall portions which are joined at the bottom edge 16. The first 12 and second 14 side wall portions have upper terminal edges 17. Slots 18 may be provided along the upper terminal edges for placement of labeling tabs. The upper terminal edges 17 may then be folded upon themselves in order to form a channel and a rod member 20 may be placed in the channel. The rod member is used to hold the hanging file folder within a storage space, such as a filing cabinet.

It should be understood that variations and modifications within the spirit and scope of the invention, beyond those discussed herein, may occur to those skilled in the art to which the invention pertains. Accordingly, all expedient modifications readily attainable by one versed in the art from the disclosure set forth herein are to be included as further embodiments of the present invention. The scope of the present invention accordingly is to be defined as set forth in the appended claims.

What is claimed is:

1. A method for manufacturing a file folder having a pocket, which comprises:

depositing an adhesive on a first edge of a first web of flexible material;

depositing an adhesive on a second edge of said first web at an angle relative to said first edge;

pressing said first web against a second web of flexible material by feeding the first and second webs together at a work station to join the first web to the second web at the first and second edges by the adhesive; and cutting said first and second webs through one of the edges to form a sheet having a pocket disposed thereon wherein at least one edge of the sheet and pocket are in sheared alignment.

2. The method for manufacturing a file folder having a pocket of claim 1, which further comprises timing the deposit of adhesive on the second edge to be operatively associated with the cutting of the first and second webs so that the cutting occurs along an axis of each edge of adhesive to be cut.

3. The method of claim 1, wherein the cutting occurs along the second angled edge and the adhesive of the second angled edge is of a width sufficient to allow cutting so that joined edges are formed on each side of the cut, the cutting forming an open edge and three joined edges on the first web.

4. The method of claim 3, wherein the second angled edge is substantially perpendicular to the first edge.

5. The method of claim 1, wherein at least one edge of adhesive is a hot melt adhesive which is extruded in a line.

6. The method of claim 5, wherein the other edge of adhesive is a hot melt adhesive which is extruded in beads.

7. The method of claim 1, which further comprises folding the sheet along a medial line to form a bottom edge with first and second side wall portions joined at the bottom edge with the first and second side wall portions having upper terminal edges.

8. The method of claim 7, which further comprises folding the upper terminal edges of the sheet on themselves to form channels.

9. The method of claim 8, which further comprises placing a rod member into each channel.

10. The method of claim 7, which further comprises providing slots for tabs along the upper terminal edges before folding.

11. The method of claim 1, which further comprises selecting different colors for the first web and the second web to provide visual differentiation between the webs.

12. The method of claim 7, wherein the first edge of adhesive is substantially parallel to the bottom edge.

13. The method of claim 1, wherein the adhesive deposited on the second edge forms a line with a first width and said first width is increased to a second width after pressing.

14. The method of claim 13, wherein an axis is defined along the length of the second edge and the second width of the second edge is sufficient to allow cutting so that the first and second webs are joined on each side of the cut.

15. The method of claim 14, wherein the first and second webs are joined along the entire length of the pocket.

16. The method of claim 1, wherein the second edge is cut substantially in half during the cutting stage such that joined edges are formed on either side of the cut.

17. A method for manufacturing a file folder having an open pocket which comprises:

depositing an adhesive on a first edge of a first web of flexible material;

depositing an adhesive on a second edge of said first web at an angle relative to said first edge;

pressing said first web against a second web of flexible material to join the first web to the second web at the first and second edges by the adhesive; and cutting the second edge of adhesive substantially in half to sever said first and second webs to form two joined edges associated with two separate pocket edges on two separate sheets.

18. The method of claim 17, wherein each adhesive is deposited as a straight line along the first and second edges of the flexible material.

* * * * *